Oct. 31, 1967    SHINOBU FUJIWARA    3,350,212
CERAMIC DIELECTRICS
Filed May 12, 1964    2 Sheets-Sheet 1
Fig-1-
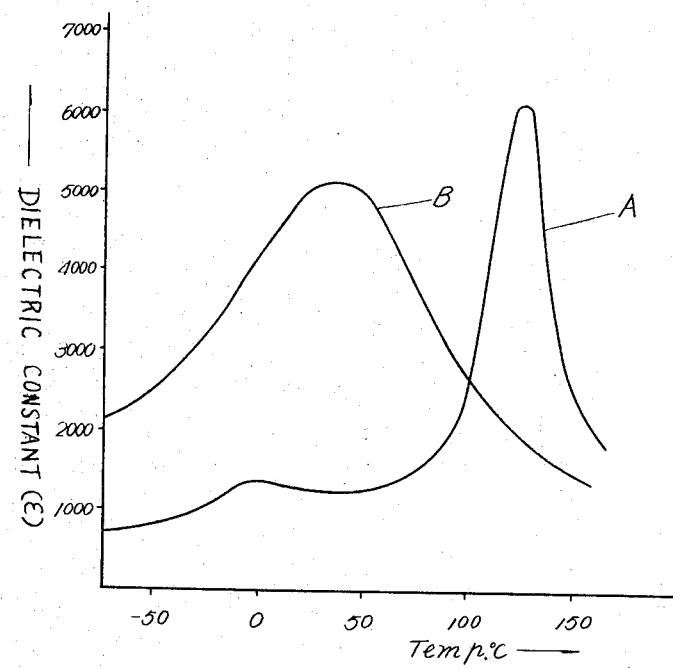
Fig-2-
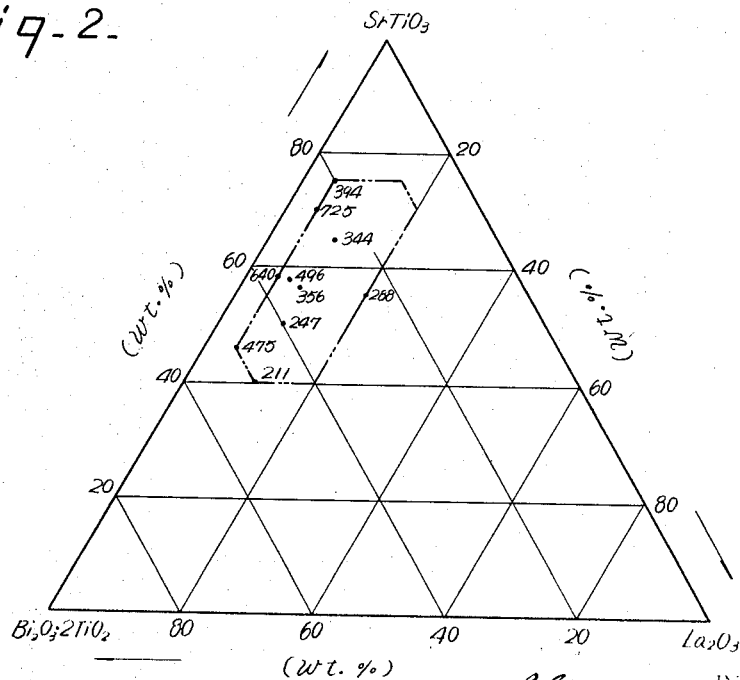
INVENTOR.
Shinobu Fujiwara
BY Wenderoth, Lind
and Ponack, Attorneys Oct. 31, 1967 SHINOBU FUJIWARA 3,350,212
CERAMIC DIELECTRICS
Filed May 12, 1964 2 Sheets-Sheet 2

Shinobu Fujiwara
INVENTOR.

BY Wenderoth, Lind and Ponack,
attorneys 3,350,212
CERAMIC DIELECTRICS
Shinobu Fujiwara, Minamiakita-gun, Akita-ken, Japan, assignor to TDK Electronics Co., Ltd., Tokyo, Japan
Filed May 12, 1964, Ser. No. 366,847
Claims priority, application Japan, May 18, 1963, 38/26,018
5 Claims. (Cl. 106—39)

ABSTRACT OF THE DISCLOSURE

The present invention provides ceramic dielectric materials having high dielectric constants, low dielectric losses and small temperature coefficients of dielectric constants. The materials consist essentially of a sintered mixture comprising $SrTiO_3$ in an amount of from 40 to 75% by weight, $Bi_2O_3 \cdot 2TiO_2$ in an amount of from 10 to 50% by weight and $La_2O_3$ in an amount of from 5 to 20% by weight. In one aspect of the invention, the $SrTiO_3$ employed is prepared by admixing $SrTiO_3$ with about 0.3% of manganese sulfate as a mineralizer and pre-sintering the mixture at a temperature of about 1300° C. The ceramic dielectric materials are useful in manufacturing of small sized capacitors.

---

The present invention relates to improvements in certain of the properties of ceramic dielectrics.

The object of the present invention is to provide ceramic dielectrics which show high dielectric constants, low dielectric losses and small temperature coefficients of dielectric constants, and these dielectric materials have advantages for making small sized capacitors which are stable to temperature changes and have small values of tan $\delta$ and very low strain inductances.

As well known, ceramic dielectrics which comprise mainly barium titanate ($BaTiO_3$) are most widely used where highly dielectric materials are required. But a dielectric material of this kind shows a very steep curve against dielectric constant as a function of temperature, at its Curie point which lies around 120° C. Therefore, it cannot be used for the kind of purposes that require a fairly constant dielectric constant over a wide temperature region, and this fact extremely limits the practical applications of the said products.

Attempts have been made to remove the sharp change of dielectric constant at the Curie point and to smooth out the temperature characteristics as completely as possible. For example, Curie point can be lowered to room temperature by adding such materials as barium stannate ($BaSnO_3$) or barium zirconate ($BaZrO_3$) to barium titanate ($BaTiO_3$), and temperature dependence can be smoothed out to some extent by the addition of such materials as calcium titanate ($CaTiO_3$) or magnesium titanate ($MgTiO_3$). But all these not only fail to attain a satisfactory improvement but also involve the lowering of dielectric constant and Q-value, and because of this fact, the products are not suitable for practical purposes.

According to the present invention, the dielectric materials have improved properties, i.e., good temperature characteristics, maintaining high dielectric constants and high Q-values at the same time.

The dielectric materials of the present invention show the desired properties in the following composition:

| Component: | Percentage by weight |
|---|---|
| $SrTiO_3$ | 40–75 |
| $Bi_2O_3 \cdot 2TiO_2$ | 10–50 |
| $La_2O_3$ | 5–20 |

The reasons for limiting the composition to said proportions are as follows:

When the proportion of strontium titanate ($SrTiO_3$) exceeds 75% by weight, the temperature for sintering requires to be higher than 1400° C. and vitrification becomes difficult, and when it is under 40% by weight, dielectric constant decreases to less than 200 and the products become porous and less dense.

When the mixture of bismuth oxide and titanium oxide ($Bi_2O_3 \cdot 2TiO_2$) exceeds 50% by weight, sintering becomes difficult with consequent poor vitrification, and Q-values become low, and when it is under 10% by weight, the temperature for sintering should be higher than 1380° C. and the vitrification becomes difficult. When the proportion of $La_2O_3$ exceeds 20% by weight, the vitrification becomes extremely difficult, and when it is under 5%, Q-values become too low.

FIG. 1 in the accompanying drawings show the relation between the dielectric constant and temperature of the highly dielectric materials which have previously been used. Curve A is the dielectric constant-temperature characteristic of a barium titanate ($BaTiO_3$) ceramic showing a very sharp change at the Curie point which lies approximately at 120° C.

Curve B is also the dielectric constant-temperature characteristic of a barium titanate ($BaTiO_3$) ceramic mixed with other material such as barium stannate ($BaSnO_3$) or barium zirconate ($BaZrO_3$), and it is seen that the Curie point is shifted and the dielectric constant change less sharply.

FIG. 2 is the ternary diagram showing the relation between the dielectric constants and the proportions of the three components of the products, strontium titanate ($SrTiO_3$), mixture of bismuth oxide and titanium oxide ($Bi_2O_3 \cdot 2TiO_2$) and lanthanum (III) oxide ($La_2O_3$). The numerical values on the diagram represent the dielectric constants.

Figure 3:
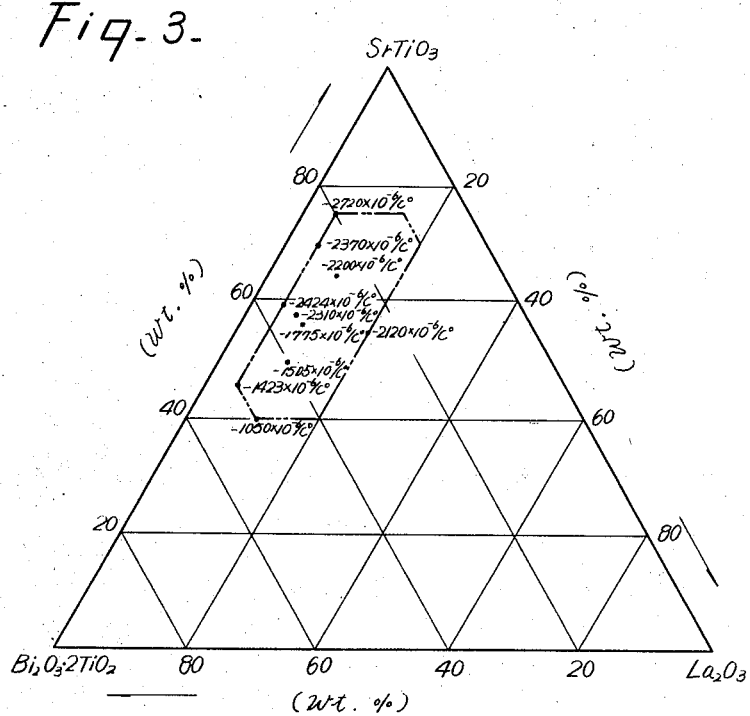
FIG. 3 is another ternary diagram showing the relation between the compositions and the temperature coefficients of dielectric constants. The numerical values on the diagram represent the temperature coefficients of dielectric constants.
Figure 4:
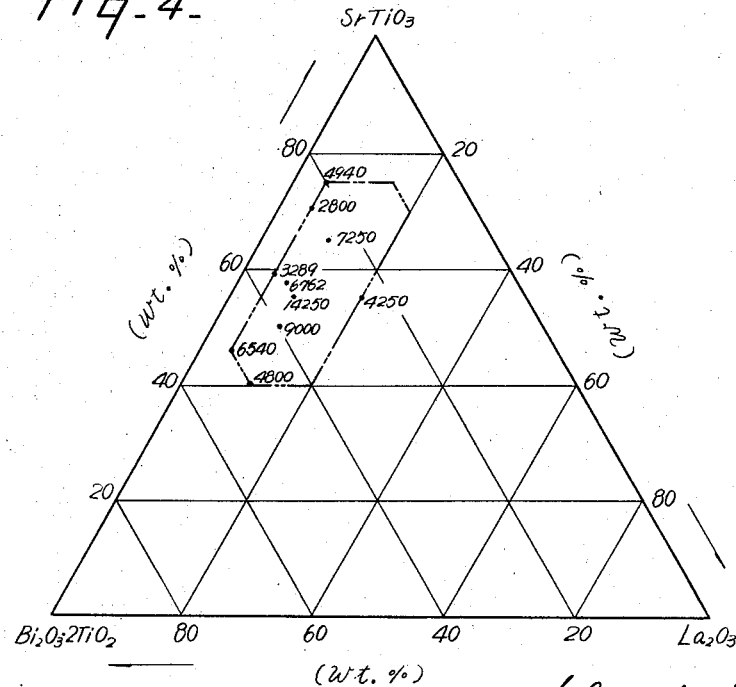
FIG. 4 is also the ternary diagram which show the relation between the compositions and Q-values, and the numerical values represent the Q-values.

The characteristic values given in FIG. 2, FIG. 3 and FIG. 4 were measured at 1 mc./s.

According to the present invention the products are obtained by the following procedure: A suitable mineralizer such as manganese sulfate ($MnSO_4$) is added to strontium titanate ($SrTiO_3$), and after pre-sintering at about 1300° C., this material is ground into powder and mixed with mixture of bismuth oxide and titanium oxide ($Bi_2O_3 \cdot 2TiO_2$) and lanthanum (III) oxide ($La_2O_3$), and finally the desired products are obtained by sintering this mixture. The sintering temperature and hours may be varied, dependent upon the composition.

Some examples of the present invention are given below.

EXAMPLE 1

Strontium titanate ($SrTiO_3$) is admixed with 0.3% of manganese sulfate ($MnSO_4$), and after pre-sintering at 1320° C., it is ground into powder and mixed with mixture of bismuth oxide and titanium oxide ($Bi_2O_3 \cdot 2TiO_2$) and lanthanum (III) oxide ($La_2O_3$) in the weight proportion of $$SrTiO_3 : Bi_2O_3 \cdot 2TiO_2 : La_2O_3 = 56 : 35 : 9$$

and the mixture is shaped and then sintered finally at

1350° C. The ceramic dielectrics thus obtained show the following properties:

Dielectric constant ---------------------------- 356
Temperature coefficient of dielectric constant ------------------------ ° C -- $-1775 \times 10^{-6}$
Q-value ---------------------------------- 14250

The properties were measured at 1 mc./s. in all of the examples.

EXAMPLE 2

Strontium titanate ($SrTiO_3$) is pre-sintered at 1320° C. with 0.3% of manganese sulfate ($MnSO_4$), then powdered and mixed with mixture of bismuth oxide and titanium oxide ($Bi_2O_3 \cdot 2TiO_2$) and lanthanum (III) oxide ($La_2O_3$) in the weight proportion of $$SrTiO_3 : Bi_2O_3 \cdot 2TiO_2 : La_2O_3 = 70:25:5$$

and after being shaped, the mixture is sintered at 1350° C., the resultant products having the following properties:

Dielectric constant ---------------------------- 725
Temperature coefficient of dielectric constant ------------------------ ° C -- $-2370 \times 10^{-6}$
Q-value ---------------------------------- 2800

EXAMPLE 3

Strontium titanate ($SrTiO_3$) is pre-sintered at 1320° C. with 0.3% of manganese sulfate ($MnSO_4$), then powdered and mixed with mixture of bismuth oxide and titanium oxide ($Bi_2O_3 \cdot 2TiO_2$) and lanthanum (III) oxide ($La_2O_3$) in the proportion of $$SrTiO_3 : Bi_2O_3 \cdot 2TiO_2 : La_2O_3 = 50:40:10$$

and then the mixture is shaped and sintered at 1350° C., yielding products with the following properties:

Dielectric constant ---------------------------- 247
Temperature coefficient of dielectric constant ------------------------ ° C -- $-1505 \times 10^{-6}$
Q-value ---------------------------------- 9000

As shown in the above examples, the dielectric materials in accordance with the present invention have excellent properties in that, while maintaining high dielectric constants, they have small temperature coefficient and high Q-values with their maximum being about 15,000.

I claim:
1. A ceramic dielectric consisting essentially of a sintered mixture of $SrTiO_3$ from 40 to 75% by weight, $Bi_2O_3 \cdot 2TiO_2$ from 10 to 50% by weight and $La_2O_3$ from 5 to 20% by weight.
2. A ceramic dielectric consisting essentially of a sintered mixture of 56% by weight of $SrTiO_3$, 35% by weight of $Bi_2O_3 \cdot 2TiO_2$ and 9% by weight of $La_2O_3$.
3. A ceramic dielectric consisting essentially of a sintered mixture of 70% by weight of $SrTiO_3$, 25% by weight of $Bi_2O_3 \cdot 2TiO_2$ and 5% by weight of $La_2O_3$.
4. A ceramic dielectric consisting essentially of a sintered mixture of 50% by weight of $SrTiO_3$, 40% by weight of $Bi_2O_3 \cdot 2TiO_2$ and 10% by weight of $La_2O_3$.
5. A ceramic dielectric material consisting of a sintered mixture of
    (a) 40 to 75% by weight of $SrTiO_3$ prepared by admixing $SrTiO_3$ with about 0.3% of manganese sulfate as a mineralizer and pre-sintering the mixture at a temperature of about 1320° C.,
    (b) 10 to 50% by weight $Bi_2O_3 \cdot 2TiO_2$, and
    (c) 5 to 20% by weight $La_2O_3$.

References Cited

UNITED STATES PATENTS

| | | | |
|---|---|---|---|
| 2,467,169 | 4/1949 | Wainer | 106—39 |
| 3,179,525 | 5/1965 | Welsby et al. | 106—39 |

FOREIGN PATENTS 1,178,181  7/1957  France.

OTHER REFERENCES

Lapluye et al.—Effects of Incorporation of Metallic Oxides on Properties of Barium Titanate—Compt. Reno. 250 (2) January 1960, pp. 305–307.

MacChesney et al.—Stabilized Barium Titanate Ceramics for Capacitor Dielectrics—J. Am. Ceramic Soc., vol. 46 (1963), pp. 197–202.

HELEN M. McCARTHY, *Primary Examiner.*